US006686710B1

(12) United States Patent
Guan et al.

(10) Patent No.: US 6,686,710 B1
(45) Date of Patent: Feb. 3, 2004

(54) CIRCUIT AND METHOD FOR REGULATING CURRENT USING AUTOBIAS

(75) Inventors: Charles Guan, San Francisco, CA (US); Andrew Morrish, Saratoga, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/325,571

(22) Filed: Dec. 18, 2002

(51) Int. Cl.[7] .................................................. G09G 1/04
(52) U.S. Cl. ........................ 315/381; 315/383; 315/403; 348/379; 348/380; 348/180; 348/807; 348/673
(58) Field of Search ................................. 315/381, 383, 315/384, 387, 403, 408, 410; 348/18, 181, 379, 380, 656, 657, 673, 692, 807

(56) References Cited

U.S. PATENT DOCUMENTS

| | | | | |
|---|---|---|---|---|
| 3,995,197 A | * | 11/1976 | Caswell ....................... 315/383 |
| 4,340,904 A | * | 7/1982 | Wingrove, Jr. .............. 348/657 |
| 4,361,785 A | * | 11/1982 | Stapleton .................... 315/389 |
| 4,442,458 A | * | 4/1984 | Barter ......................... 348/380 |
| 4,894,725 A | * | 1/1990 | Sendelweck ................. 348/380 |
| 5,400,086 A | * | 3/1995 | Sano et al. .................. 348/678 |

OTHER PUBLICATIONS

Philips Semiconductors; "I2C–Bus Controlled TV Display Processors;" TDA9336xH Series; May 8, 2000.

* cited by examiner

Primary Examiner—Haissa Philogene

(57) ABSTRACT

A circuit for regulating a signal, such as a cathode current. The circuit has an input stage for inputting a signal and for producing a sense signal based thereon. The circuit may input timing signals and have a first stage for comparing a first reference signal with the sense signal when a first timing signal indicates and for outputting a first correction signal based on the comparison. The circuit may have a second stage for comparing a second reference signal with the sense signal when a second timing signal indicates and for outputting a second correction signal based on the comparison. The circuit may further have elements for measuring a leakage signal in the input signal during a third time interval. In this embodiment, the first and second stages are further for subtracting the leakage signal from the sense signal prior to the comparisons.

20 Claims, 9 Drawing Sheets

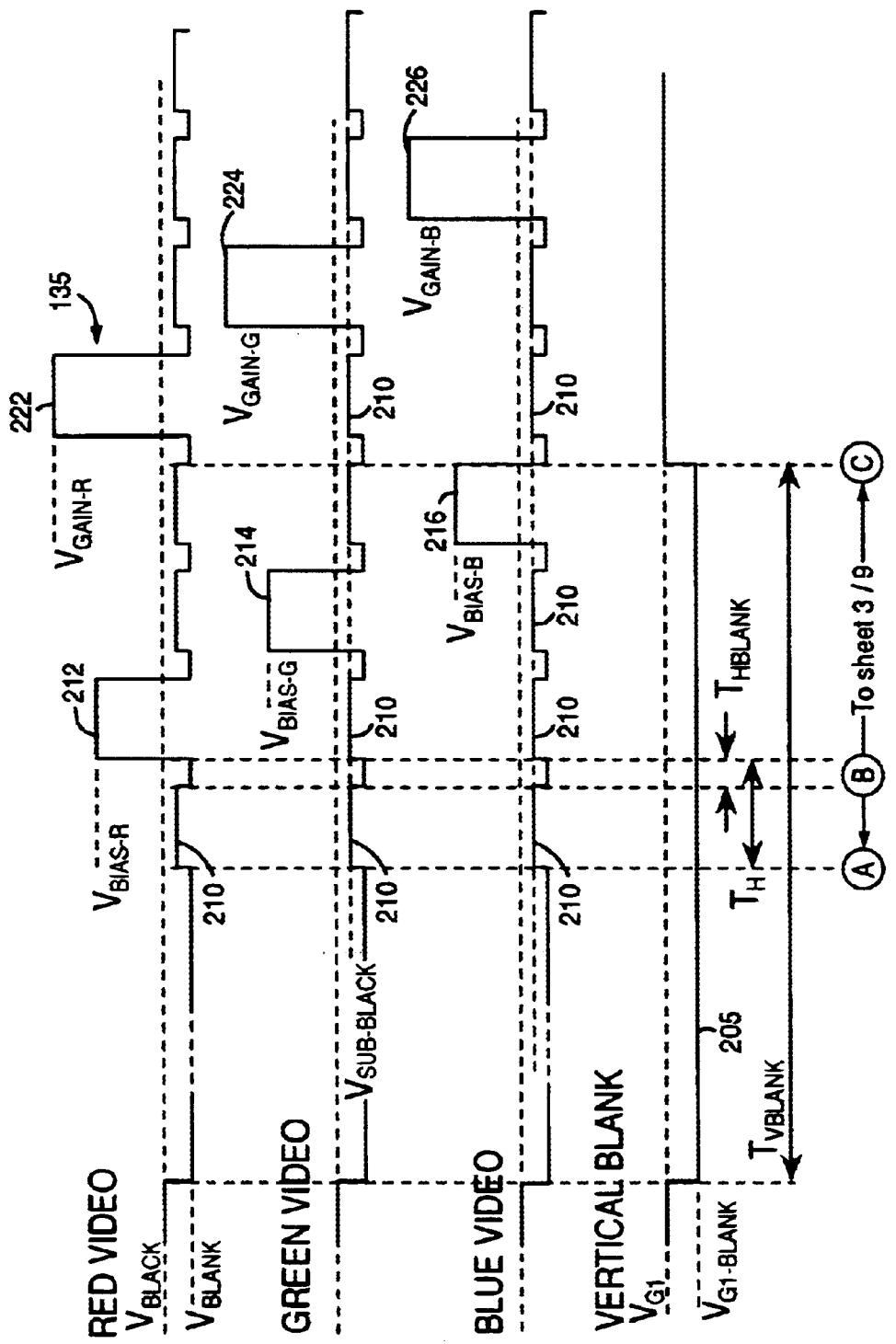

CIRCUIT AND METHOD FOR REGULATING CURRENT USING AUTOBIAS

This application is related to, commonly-owned U.S. patent application Ser. No. 10/325,018, filed Dec. 18, 2002, entitled "SYSTEM AND METHOD FOR REGULATING CATHODE RAY TUBE BEAM CURRENT USING AUTOBIAS" to Guan et al.

TECHNICAL FIELD

The present invention generally pertains to the field of electronic circuits. More particularly, embodiments of the present invention are related to a circuit for regulating a signal using autobias.

BACKGROUND ART

A conventional cathode ray tube (CRT) creates an image on a phosphor coated display screen by focusing a beam of electrons onto the screen and thus making the phosphors emit visible light. The electron beam is typically formed by first causing a cathode inside the vacuum of the CRT to emit electrons by applying a differential voltage between the cathode and a grid. The CRT has one or more anodes to attract, focus, and accelerate the electrons. Thus, the anodes may collimate the electrons into a tight beam hitting a spot of the display screen. By creating currents in coils outside the CRT, a magnetic field is created within the CRT to direct the electron beam at any desired spot of the display screen.

As the phosphors in a CRT respond to the intensity of the beam current, the brightness of the picture will be a function of the beam current. However, the beam current does not stay constant for a given cathode voltage over its lifetime. Hence, the picture intensity will typically change even though the same voltage is applied to the cathode. Thus, it is desirable to have a means to compensate to keep the CRT picture uniform over time.

Compensation systems have been proposed to reduce this problem. Some techniques are suitable for a DC coupled system, but not for an AC coupled system. Such a DC coupled system typically requires significant power and slows the response of the system relative to an AC coupled system.

Thus, a need exists for a technique for compensating for changes in picture intensity in a CRT due to aging on the CRT. A further need exists for a technique that does not consume considerable power. A still further need exists for a technique that does not change the time response of the system when varying the bias voltage. A still further need exists for a technique to be used in an AC coupled system.

SUMMARY

The present invention provides a circuit and method for regulating a signal, such as a beam current in a cathode ray tube. Embodiments consume less power than some conventional techniques. Embodiments do not change system response time when varying the bias voltage as do some conventional techniques. Embodiments are suitable for a system in which the CRT is AC coupled to driver circuitry.

A regulating circuit and method are disclosed. The circuit may comprise an input stage for inputting a signal and for producing a sense signal based thereon. The input signal may be from a cathode ray tube. The circuit may have elements for inputting a plurality of timing signals including a first and a second timing signal. The circuit may have a first stage for comparing a first reference signal with the sense signal when the first timing signal indicates and for outputting a first correction signal based on the comparison. And the circuit may have a second stage for comparing a second reference signal with the sense signal when the second timing signal indicates and for outputting a second correction signal based on the comparison.

The circuit may further comprises elements for measuring a leakage signal in the input signal during a time interval defined by a third timing signal of the plurality of timing signals. In this embodiment, the first stage is further for subtracting the leakage signal from the sense signal prior to the comparison.

These and other advantages of the present invention will no doubt become obvious to those of ordinary skill in the art after having read the following detailed description of the preferred embodiments which are illustrated in the various drawing figures.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

Embodiments of the present invention obtain an accurate biasing of a CRT by using an autobias system to regulate the beam current. The autobias system may be a closed loop system, responding to variations in the system under feedback control to regulate the beam current. By inserting low and a high test level pulses, the resulting cathode currents can be measured and compared to pre-determined desired currents to control the beam current.

Figure 1:
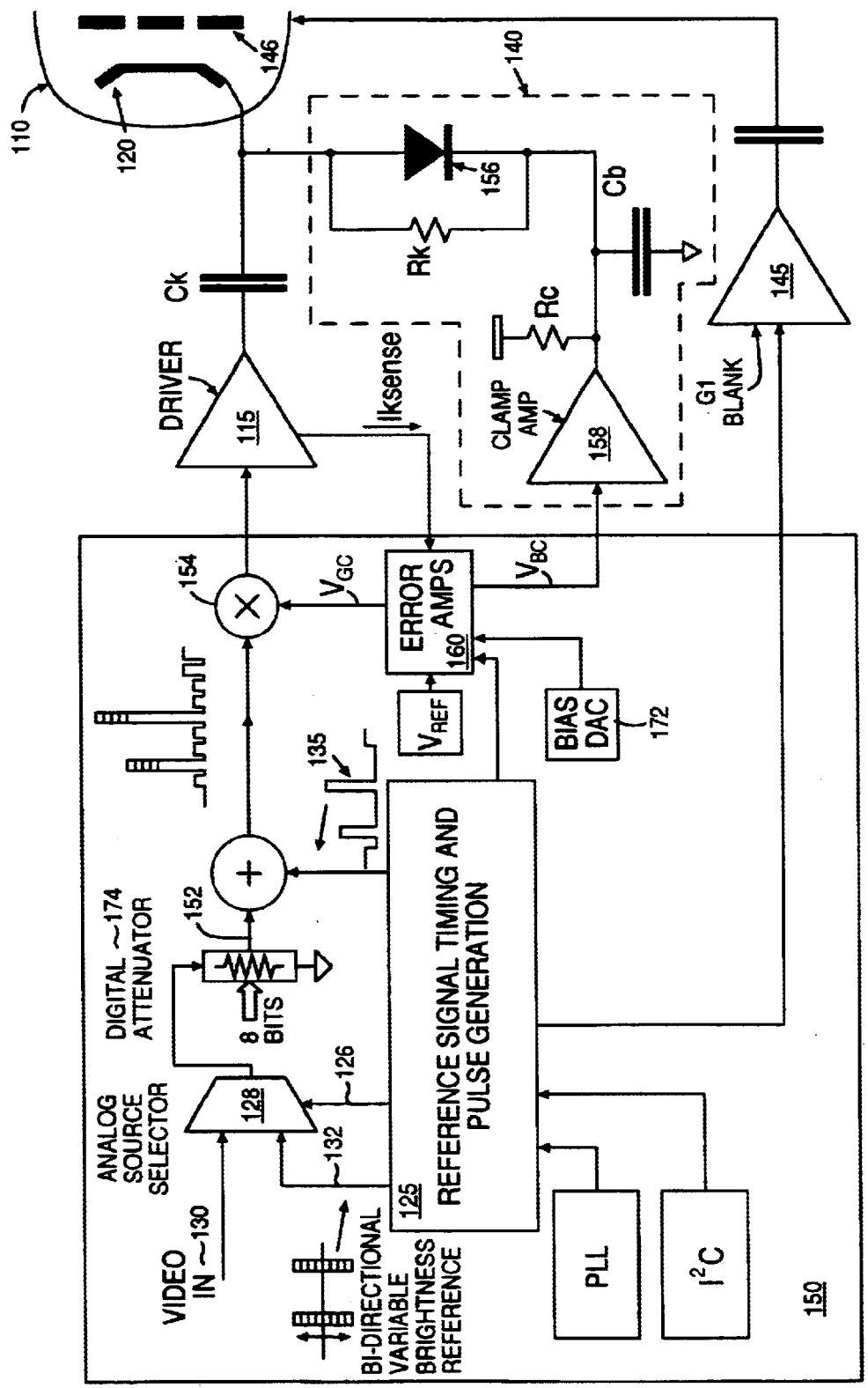
FIG. 1 is a diagram of a system for regulating current in a cathode ray tube, according to embodiments of the present invention.

FIG. 1 illustrates a system for regulating current in a cathode of a CRT 110. The chip 150 outputs a video signal to a gain amplifier 115 that is coupled to a cathode 120 of the CRT 110. The chip 150 periodically test the cathode 120 by outputting a test signal 135 comprising a number of pulses of variable magnitude. The error amplifiers 160 measure the response to the test signal 135 and output compensation signals $V_{GC}$ and $V_{BC}$.

When testing the cathode 120, the test signal timing and pulse generation logic 125 may output a signal 126 to a MUX 128 to select a bi-directional variable brightness test signal 132, which is combined with the test signal 135. When not under test a video in signal 130 may be selected.

A clamping circuit 140 coupled to the cathode 120 may provide a DC bias signal thereto. A blanking amplifier 145 may be coupled to a grid 146 of the CRT 110 to provide a blanking signal. The simplified system only shows one cathode 120 and associated gain driver 115 and clamping circuit 140. However, the system may comprise a plurality of channels (e.g., red, blue, green) each with its own cathode 120, gain driver 115, and clamping circuit 140.

The autobias system may be AC coupled. However, embodiments of the present invention are not so limited. Each gain driver 115 (only one driver shown) may have a current source output, which may be summed together. In this fashion a current ($I_{ksense}$) that may be proportional to the sum of the beam currents flowing from the three cathodes 120 of the CRT 110 may be input to the chip 150. The $I_{ksense}$ input may act as a constant voltage source and maintain a constant voltage at the output pin within the normal range of the beam current.

Error amplifiers 160 in the chip 150 may generate two control signals (e.g., voltages), $V_{GC}$ and $V_{BC}$ by measuring the beam current that results from various amplitude drive pulses of the test signal 135 and superimposed on the video signal 152 to the gain driver(s) 115. The gain control voltage, $V_{GC}$ may control the gain of the active video signal through a voltage controlled amplifier 154, in order to maintain the beam current at a constant predetermined level during a high level test drive pulse. The bias control voltage $V_{BC}$ may control the DC offset of the signal fed to the clamp circuit 140 in order to maintain the beam current at constant predetermined level during a low level test drive pulse.

A function of the autobias system is to allow accurate determination of the beam current in the presence of factors that may generate appreciable error. There may be two main contributors that cause error in the measurement. One main contributor is leakage and bias currents in the gain driver(s) 115. The other is charge currents that flow through the resistor Rk in parallel with the clamp diode 156. The current that flows in resistor Rk is needed in order to charge the coupling capacitor at start up and when the DC bias is changed. This current may be comparable in magnitude to the beam current. Embodiments of the present invention subtract these currents from the measured $I_{ksense}$ in order to allow accurate operation of the autobias system.

The autobias system is a closed loop system, responding to variations in the system under feedback control to regulate the beam current. To allow stable operation, the error amplifiers 160 provide appropriate frequency compensation to the loop transfer characteristics. One consideration to setting this compensation is that the AC coupling capacitors in the output cathode drive form a relatively low frequency roll off in the bias control system. This cutoff frequency varies with the image loading. The bias control amplifiers (e.g., clamping amplifiers 158) can quickly discharge the coupling capacitors through the clamp diode 156, but recharging can take much longer, as this may be facilitated through either beam current or through the charging resistor, Rk. Another consideration is that the maximum frequency within the loop may be governed by the sampling nature of the $I_{ksense}$ sampling system, which may operate by sampling the beam current during the blanking period at vertical refresh frequency. Additional details of FIG. 1 will be discussed herein below.

Figure 2:
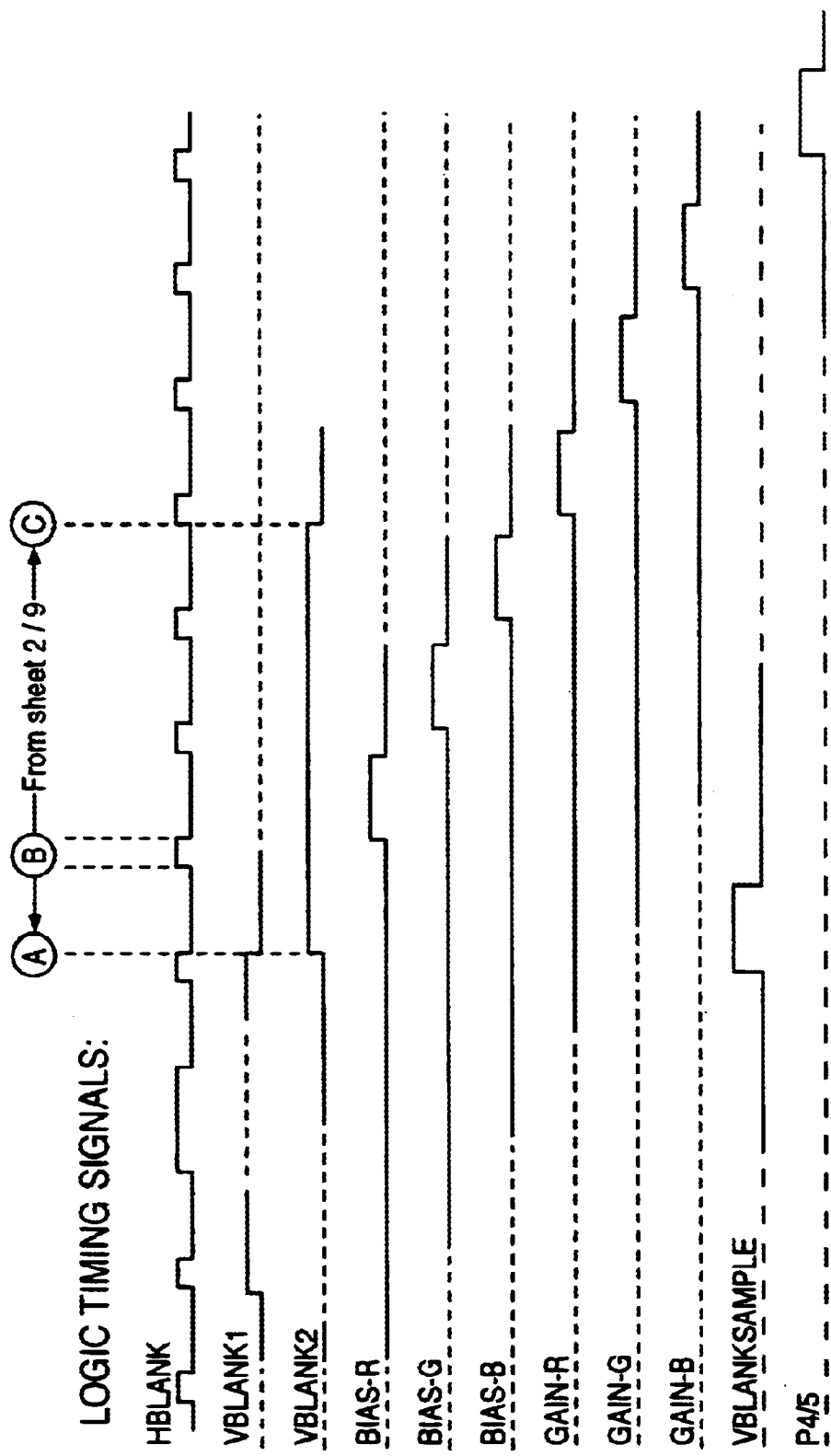
FIG. 2 is a diagram of test timing signals, according to embodiments of the present invention.

Referring now to FIG. 2, the test signal 135 may comprise three measurement intervals for each cathode. The main signal drives to the red, green, and blue inputs of the gain drivers and to the G1 blanking amplifier are shown in FIG. 2, as well as logic timing signals. The first measurement interval period may occur when the logic signal "$V_{blank-sample}$" is active. During the first measurement interval, a very low voltage signal may be input to all three (RGB) channels. In this fashion, a leakage and an offset current may be measured.

The second interval may span the periods during which the logic signals, "Bias-R", "Bias-G", and "Bias-B" are active. During the second interval, each of the three channels is stimulated in succession with a pulse of pre-determined magnitude to measure low-level beam currents.

The third interval may span the periods during which the logic signals, "Gain-R", "Gain-G", and "Gain-B" are active. During the third interval, each of the three channels is stimulated in succession with a pulse of pre-determined magnitude to measure high-level beam currents. The logic timing signals are created and fed to analog sections in the chip 150 for test pulse generation and for operation of sample and holds in the error amplifiers 160, etc. The order in which the three intervals are performed is not critical.

Leakage and Offset Current Interval

Still referring to FIG. 2, a baseline measurement of the leakage and offset currents may first be made in order that these errors can be eliminated from the $I_{ksense}$ feedback measurements. Embodiments of the present invention cause the beam current to be zero during this interval, so that only the baseline currents are measured. Zero beam current may be ensured by two means:

a) a negative vertical blanking pulse 205 may be applied to G1 (e.g., blanking amplifier 145, FIG. 1); and b) a small blacker than black signal 210 may be applied to the cathodes.

Note that the vertical blanking pulse 205 may be applied both before and after the first interval. For example, the period before the first interval may correspond to the normal vertical blanking interval. Thus, the first interval may correspond to the time following the vertical-blanking interval when the first line is being drawn on the CRT.

Embodiments of the present invention drive the cathodes as far into the black level as possible without causing the gain amplifier to go into upper level cutoff saturation, or beyond the clamp level. If the gain amplifier is driven into upper level cutoff saturation, then the active leakage and bias currents may fail to be accurately measured. As indicted by the test signals in FIG. 2, all three cathodes may be driven into the sub-black level simultaneously. Thus, the combined leakage and offset currents of all three channels may be measured simultaneously.

Low Level Drive Interval

A measurement of the low level beam currents may be made for each cathode in sequence on consecutive lines after the baseline current measurement, thus taking three lines to complete these measurements. As seen in FIG. 2, the vertical blank signal is at the level "$V_{G1\text{-}Blank}$," so the G1 voltage is still being driven negative with respect to the normal operation (e.g., $V_{G1}$). Thus, this embodiment measures the low-level beam current during an extension to the vertical-blanking interval. For example, the time "$T_{VBLANK}$" may be longer than a normal vertical blanking interval done without the test.

The cathode being measured may be driven with a pulse that is equal in amplitude to the negative G1 blanking pulse plus the low-level test pulse.

FIG. 2 shows this as $V_{BIAS\text{-}R}$ 212, $V_{BIAS\text{-}G}$ 214 or, $V_{BIAS\text{-}B}$ 216. The other two cathodes may be driven with the sub-black baseline level 210. In this way, the change in current of the $I_{ksense}$ feedback current can be made relative to zero beam current in the cathode not being tested.

The beam current may be dependent upon the differential voltage between G1 and the cathode of interest. The low level drive may be set to create a differential drive of, for example, 30 volts on the measured cathode.

However, other differentials may be used. A reference current level (e.g., FIG. 4, $I_{BIAS}$) may be set to be equal to this nominal beam current level which arises from such an application of a differential voltage with a nominal CRT.

High Level Drive Interval

A measurement of the high level beam currents may be made for 20 each cathode in sequence on consecutive lines, thus taking three lines to complete these measurements. Embodiments allow the vertical blanking pulse to end before the measurements are made, as seen in FIG. 2. Also, the G1 voltage is allowed to stabilize at its normal value, including any charge time for any G1 de-coupling. The cathode being measured may be driven with the high-level test pulse ($V_{GAIN\text{-}R}$ 222, $V_{GAIN\text{-}G}$ 224, or $V_{GAIN\text{-}B}$ 226) and the other two cathodes may be driven with the sub-black baseline level 210.

It is possible that at high brightness settings, the two cathodes that are being driven to the sub-black level 210 may cause one or both of those cathodes to turn on, as the brightness bias increase may drop the cathode voltage into conduction. The contribution of the two nominally sub-black drive cathodes is small compared to the high current flowing in the cathode under measurement, but it may have the effect of causing a small drop in the peak drive at high brightness levels, in the order of a few percent. The high level drive (222, 224, 226) may be set to create a differential drive of 100 volts on the measured cathode with respect to G1. However, other voltages may be used. A reference current level (e.g., FIG. 4; $I_{GAIN}$) may be set to be equal to this nominal beam current level which arises from such an application of a differential voltage with a nominal CRT.

$I_{KSENSE}$ Measurement

Figure 3:
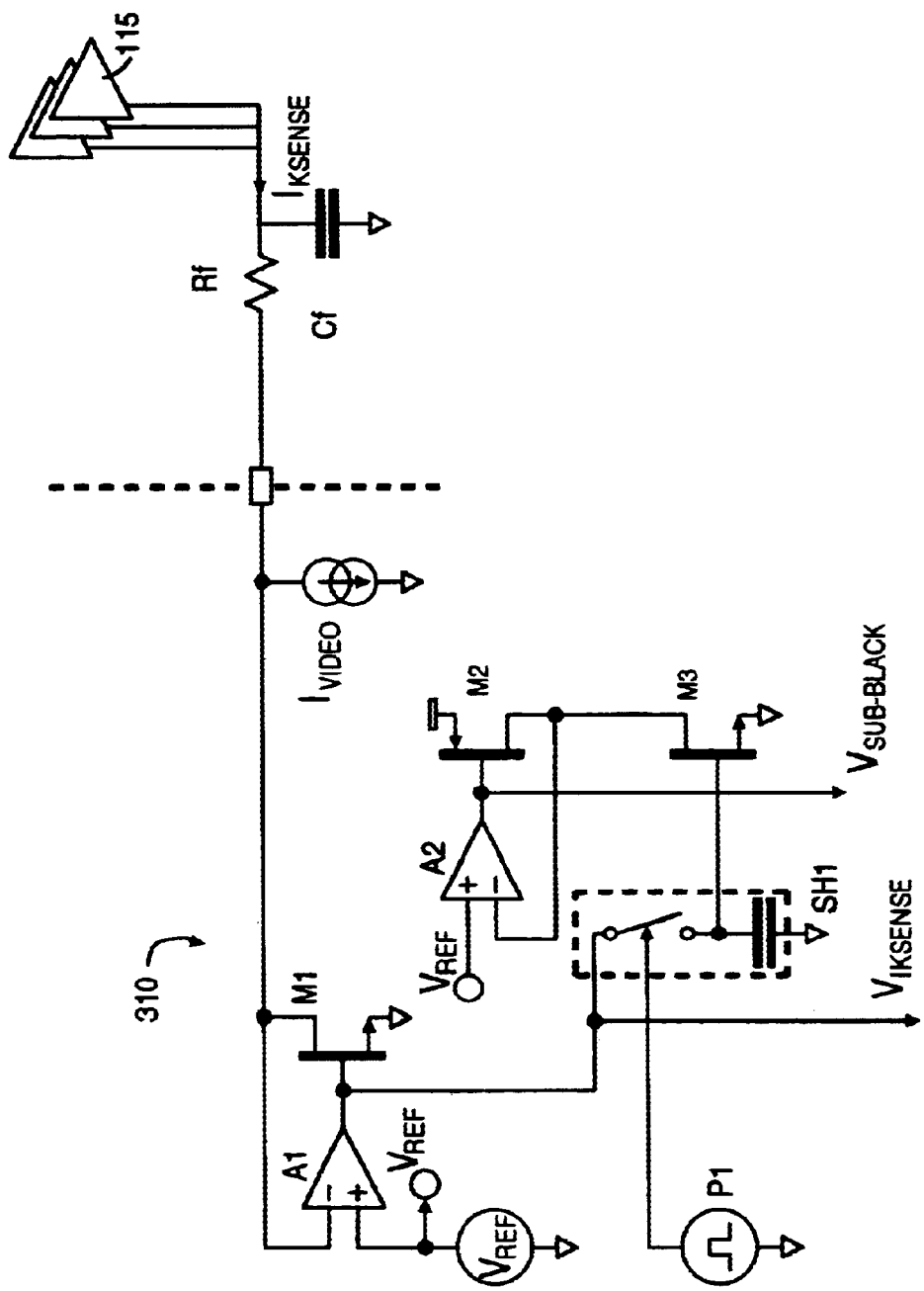
FIG. 3 is a diagram of a circuit for measuring a signal from a cathode, according to embodiments of the present invention.

FIG. 3 illustrates an input stage 310 portion of the error amplifier circuitry 160 of the chip 150 from FIG. 1. Also shown are several gain drivers 115 coupled thereto. The $I_{ksense}$ output from the gain driver(s) 115 may appear as a current source. The chip may have an accurately determined current source internally. For example, a band gap voltage reference and an external resistor may be used to create the current source.

It is possible to use the current source directly rather than convert to a voltage signal through an external resistor. The $I_{ksense}$ input may appear as a constant voltage source. For example, this may be on the order of 2.5 volts, but this is not limiting. High frequency de-coupling may consist of a capacitor and a resistor placed at this point to ground to bypass high frequency transients that result from charging and discharging stray output capacitance, to enable stable operation of the internal voltage source, and to facilitate some arc protection. Suitable values for the filter components are 10 nF and 100 ohms, respectively.

The $I_{ksense}$ signal from the gain driver(s) 115 may consist of the summation of three elements from each of the three channels:

a) current flowing in the recharge resistor (FIG. 1 $R_k$), as a result of cathode voltage signal;
 b) the leakage and bias DC currents from the gain driver 115; and
 c) the CRT beam current.

The first of these is an active signal that may be dependent upon the value of $R_k$ and the cathode signal voltage swing. A current source, $I_{video}$, subtracts a current given by equation 1.

$$I_{video}=(V_R+V_B+V_G)*G_{DRIVER}/R_k \qquad \text{Equation 1:}$$

Where $V_R$, $V_B$, and $V_G$ are the video signals at the output of the chip, $G_{DRIVER}$ is equal to the gain of the gain driver 115, and $R_k$ is equal to the value of the recharge resistor. Thus, it may be desirable that the value of $R_k$ is fixed and not varied by the application designer.

Still referring to FIG. 3, the resulting $I_{ksense}$ minus $I_{video}$ current source may connect to the output of an open drain amplifier consisting of a transistor, M1, and an operational amplifier, A1. A1 monitors the voltage at the drain of M1 and references this to an internally generated voltage reference, $V_{REF}$. A suitable value for $V_{REF}$ is 2.5 volts, although embodiments of the present invention are not so limited. The dynamic signal, $V_{Iksense}$, at the gate of M1 controls the current in M1 such that its drain current equals the summation $I_{ksense}$ minus $I_{video}$ at all times, except at very high frequencies limited by $R_f$ and $C_f$. The dynamic signal, $V_{Iksense}$ may be fed to other stages in the error amplifier circuitry.

Leakage Error Signal Measurement and Subtraction

The signal P1 in FIG. 3 may correspond to the logic timing signal $V_{blanksample}$ in FIG. 2. This pulse may be fed into the sample and hold circuit block, SH1, which momentarily samples the gate voltage to M1 at the end of the sub-black period (e.g., defined by $V_{blanksample}$), and applies this to the gate of an identical transistor, M3. Operational amplifier A2 also references the voltage reference $V_{REF}$ and maintains the drain voltages of transistors M2 and M3 at the reference voltage regardless of the current in M3. As M1 and M3 have identical gate voltages during the sampling period $V_{blanksample}$, and both have drain voltages regulated to the reference voltage $V_{REF}$, the current in M2 and M3 is thus set identical to the level in M1 during the sub-black period. For example, this may be the same as the leakage current level.

The gate voltages of M1 and M2 (e.g., $V_{Iksense}$ and $V_{sub\text{-}black}$) may be fed to stages in each of the three channels.

Figure 4:
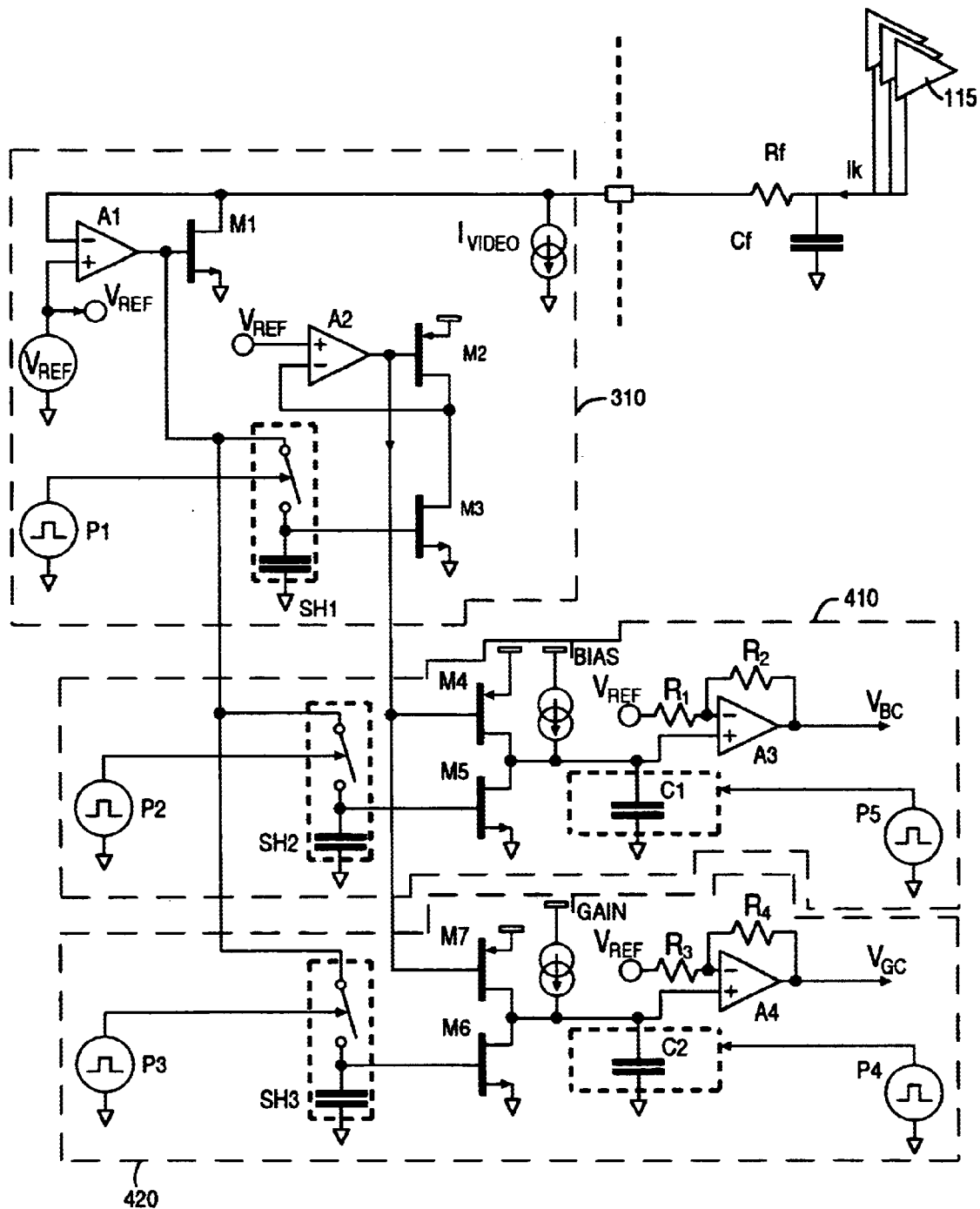
FIG. 4 is a diagram of a circuit for regulating cathode current, according to embodiments of the present invention.

FIG. 4 shows an input stage 310 coupled to a bias level stage control stage 410 and a gain level control stage 420. Each channel may have its own bias level control stage 410 and gain level control stage 420, although only one of each is shown in FIG. 4. However, there need be only one input stage 310. The dynamically varying $V_{Iksense}$ signal may be sent to a sample and hold circuit SH2 in the bias level control stage 410 of each channel. The gain level control stage(s) 420 may also receive the dynamically varying $V_{Iksense}$ signal via sample and hold circuit SH3. In this case, the signal P2 may correspond to one of the bias logic timing signals in FIG. 2 (e.g., bias-R, bias-G, and bias-B). In this fashion, the value of $V_{IKSENSE}$ that is sampled corresponds to the period when one of the low-voltage pulses (e.g., FIG. 2, 212–214) is applied to one of the cathodes, depending on whether the bias stage 410 is for the red, blue or green channel. Thus, the sample and holds in the bias stage 410 samples the gate voltage on M1 during the bias level detection periods, such that the devices M5 and M6 mirror the current in M1 at the time of sampling.

In the bias control stage 410, the gate of M4 is driven by the gate voltage of M2, thus mirroring the current sampled during the sub-black period (e.g., when $V_{BLANKSAMPLE}$ is active in FIG. 2). The drain currents of M4 and M5 are summed with a reference current source ($I_{BIAS}$) that is set at the nominal level of the bias current level. As there is no DC path, the long-term summation of these currents is zero. In the short term, these currents charge or discharge the capacitor C1, producing an error voltage at the input of the operational amplifier A3. The error signal is amplified by the error amplifier that references to the voltage reference source to provide an output voltage, which is fed out of the chip to the clamp amplifiers (FIG. 1, 158). The output voltage of A3, $V_{BC}$, may be used as the control voltage to drive the clamp amplifiers (FIG. 1, 158). The clamp amplifiers amplify this voltage, and the output voltage is used as the clamp voltage to set the bias clamp level of the video clamp pedestal.

The gain control stage 420 functions in a somewhat similar fashion to the bias control stage 410. In this case, the signal P3 may correspond to one of the gain logic timing signals in FIG. 2 (e.g., gain-R, gain-G, and gain-B). In this fashion, the value of $V_{IKSENSE}$ that is sampled corresponds to the period when one of the high-voltage pulses (e.g., FIG. 2, 222–226) is applied to one of the cathodes. The drain currents of M6 and M7 are summed with a reference current source ($I_{GAIN}$) that is set at the nominal level of the gain current level. Further, the control voltage, $V_{GC}$, derived from A4 may be used to vary the voltage controlled gain circuit (FIG. 1, 154).

In one embodiment, during normal linear operation, the voltages across the capacitors C1 and C2 are within 0.5 volts of a typical reference voltage of 2.5 volts, so that the accuracy of the current mirrors is maintained within reasonable limits. Because it may not be practical to fabricate large capacitors within the chip, capacitors C1 and C2 may be simulated using pulses P4 and P5. These pulses may correspond to the logic timing signals P4/5 in FIG. 2. The values for resistors R1–R4 may be selected to achieve he desired gain for amplifiers A3 and A4.

Bias Adjustment Operation

Figure 5:
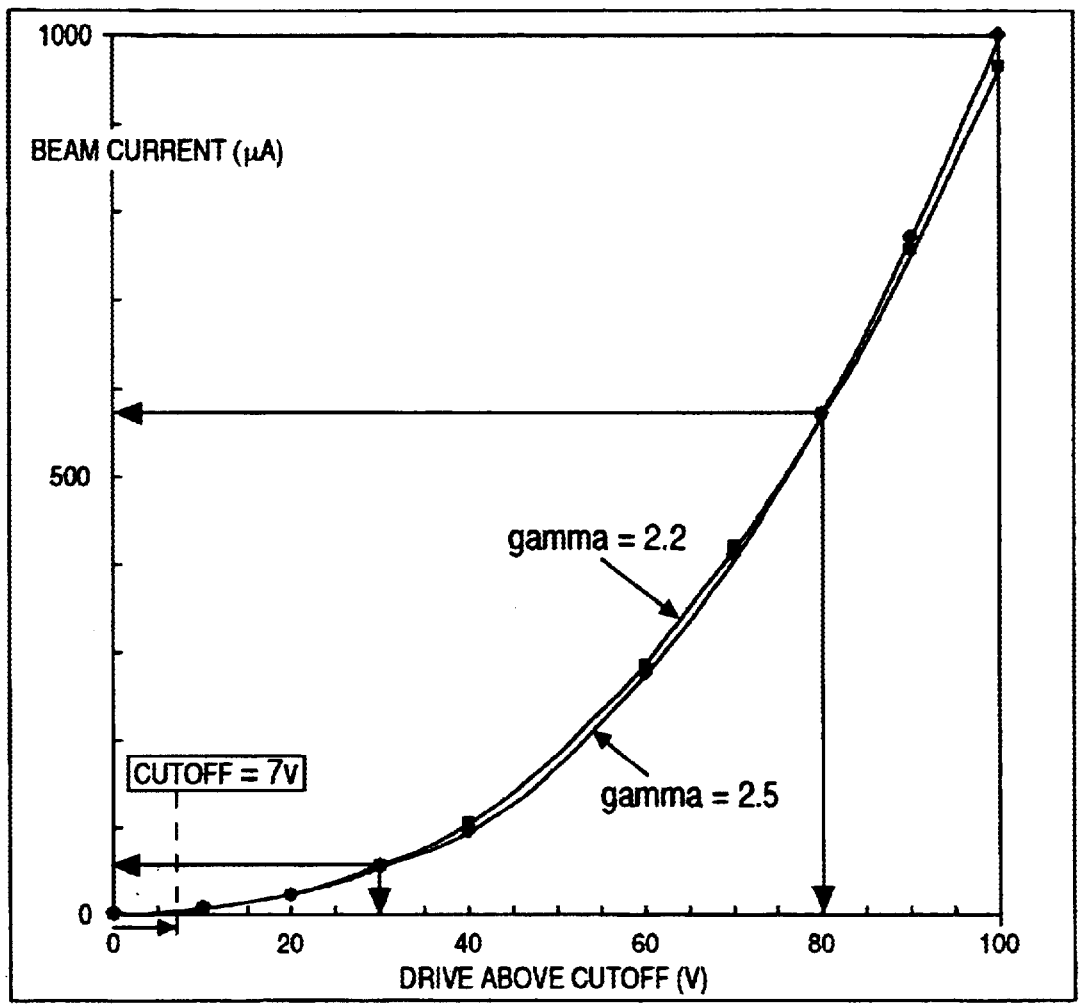
FIG. 5 is a graph illustrating how variation in CRT gamma affects black level.

The reference current levels may be chosen such that a CRT with a nominal gamma of 2.5 will be automatically set so that the signal black level corresponds to cutoff to the CRT. However, if the gamma is different, or some other source of error exists, then the black level and cutoff voltage will not be equal. For example, a CRT with a gamma of 2.2 may have a cutoff voltage that is 7 volts lower than that of a CRT with a gamma of 2.5, as shown in FIG. 5. To allow for variation in the setup point of the cutoff, either one or both of the test voltage pulses (e.g., FIG. 2, $V_{BIAS}$ 212–216 or $V_{GAIN}$ 222–226) or one or both of the reference current levels (e.g., FIG. 4, $I_{BIAS}$ or $I_{GAIN}$) can be adjusted.

Referring again to FIG. 1, to facilitate the bias adjustment, the bias reference current (e.g., $I_{BIAS}$, FIG. 4) may be varied by a bias DAC 172. For example, the value may be altered by +/−25 μA about the nominal value. This adjustment may be performed as a factory setting before the device with the CRT is shipped. This variation in bias current reference corresponds to a variation in cathode voltage drive, so the bias control loop adjusts the bias DC level up or down as appropriate. Movement of the DC bias level may also affect the high level cathode drive, and so the gain loop then also reacts to maintain its feedback beam current at the maximum reference level (e.g., $I_{GAIN}$, FIG. 4). The ratio of the low to high test pulses may be fixed, for example at 5:8, although this is not limiting. This may mean that a change in gain may multiply a +/−6 volts variation to create a +/−15 volts effective variation in the black level. This leverage can be seen from the Equation 2. At the cathode, the ratio of the black level voltage, $V_B$, the low level voltage drive, $V_L$, and the high level voltage drive $V_H$, must be in the ratio P where:

$$V_B - V_L = P*(V_B - V_H) \qquad \text{Equation 2:}$$

Thus, $$V_B = V_L - (P*V_H)/(1-P) \qquad \text{Equation 3:}$$

The variation in the black level $V_B$ with variation in $V_L$, keeping $V_H$ constant is thus:

$$dV_B/dV_L = 1/(1-P) \qquad \text{Equation 4:}$$

With P=5/8, this means that the variation in black level is around 2.7 times greater that the variation in the black level as a result of the variation in the 15 reference current level. When the bias is manually adjusted to vary the black level during setup, the gain will also vary. Thus, bias adjustment should be carried out before any high-level color balance operations are performed.

Referring still to FIG. 1, the brightness test signal 132 for each channel may be created by ORing the bias and gain control pulses together. An 8-bit digitally controlled attenuator 174 may be used as a gain control. A channel specific bi-directional brightness test signal 132 is added into the video prior to the digital attenuator block 174 in order that the video signal 130 and the brightness test signal 132 are equally affected by the gain setting.

Figure 6:
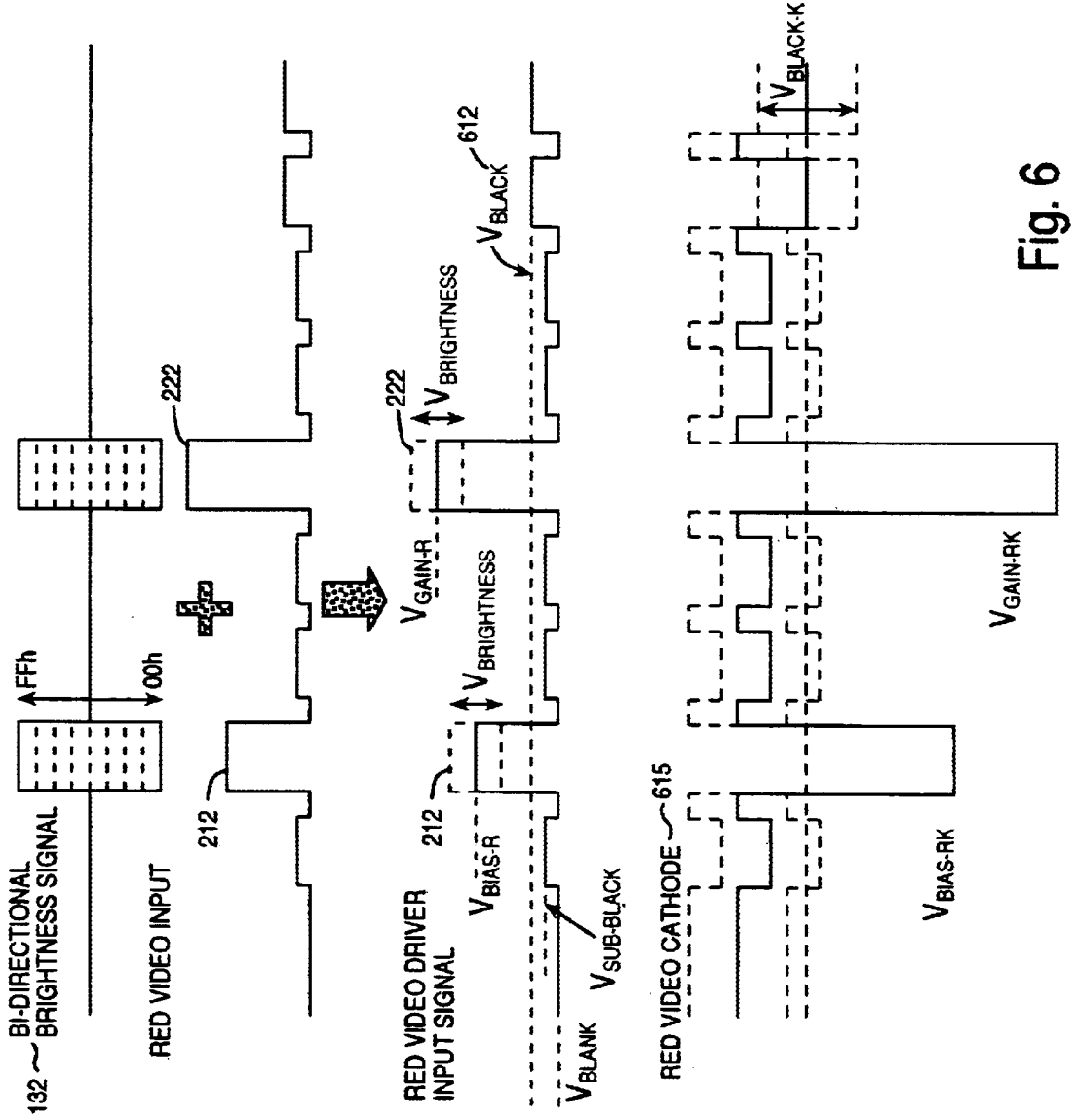
FIG. 6 is a diagram illustrating variation in test signals with brightness, according to embodiments of the present invention.

Referring now to FIG. 6, the variable brightness signal 132 adds to, or subtracts from, the low 212 and high level 222 test signals, altering the peak to peak relative to the black level 612 and hence the ratio of these signals. The cathode gain drives 115 are maintained by the closed loop operation, such that the beam current at the sampled points is always maintained at a level that is equal to the reference current levels. Thus, even as the drive signals vary, the cathode voltage drive and hence beam current at these test levels stays constant. For example, the voltage $V_{BIAS-RK}$ and $V_{GAIN-RK}$ in the red video cathode signal 615 remain fixed, while the dashed portion of the signal reflects the variation. As in the bias adjustment, the voltage drives stay in the proportion P, such that:

$$V_B - (V_L + V_{BR}) = P*(V_B - (V_H + V_{BR})) \quad \text{Equation 5:}$$

Or $$V_B = (V_L + V_{BR}) - (P*(V_H + V_{BR}))/(1-P) \quad \text{Equation 6:}$$

As P, $V_L$ and $V_H$ are all constant, it thus follows that:

$$dV_B/dV_{BR} = 1 \quad \text{Equation 7:}$$

That is, the black level varies directly with the addition brightness signal offset.

Figure 7:
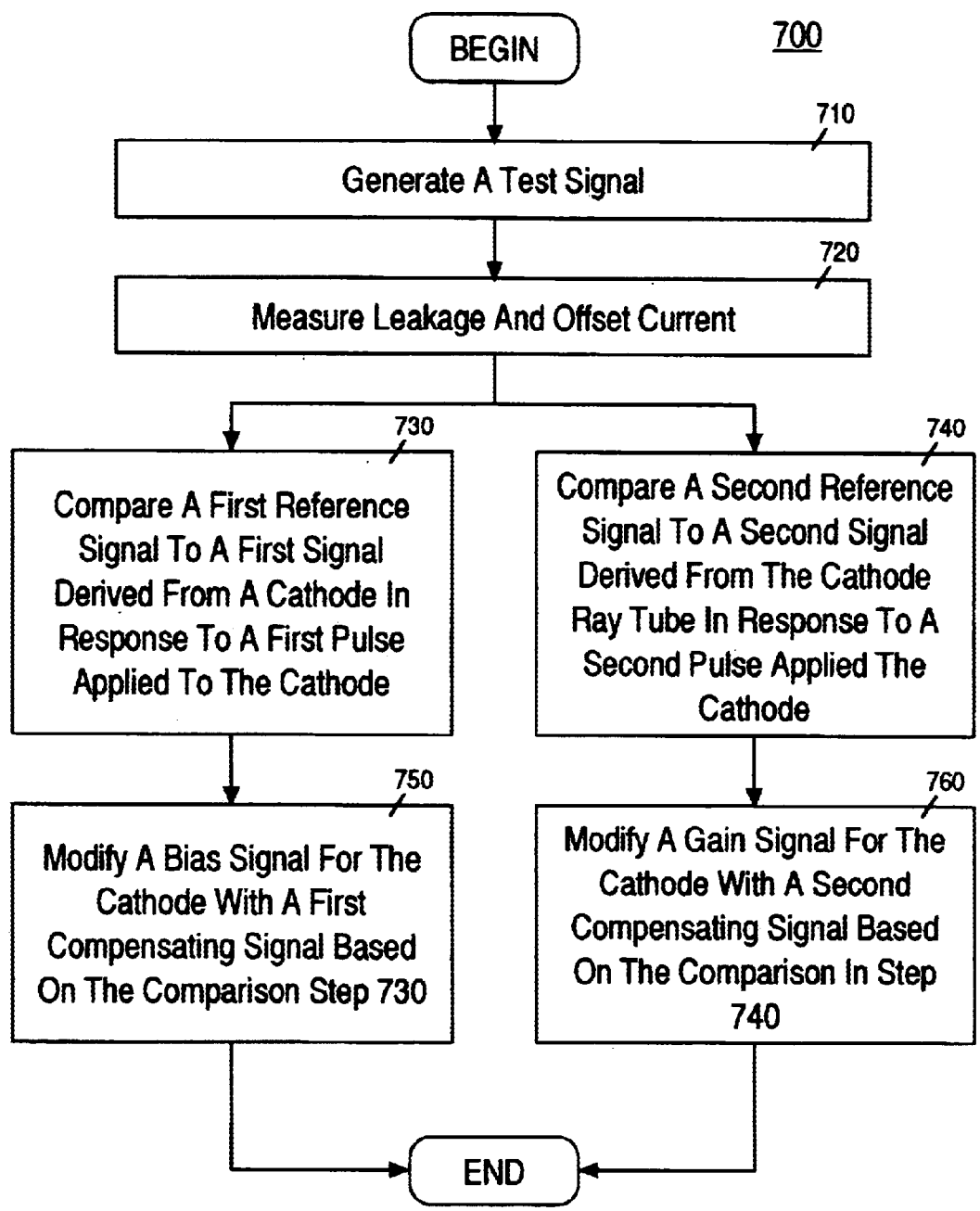
FIG. 7 is a flowchart illustrating steps of a process of regulating cathode current, according to embodiments of the present invention.

An embodiment of the present invention is a method of regulating cathode current. Referring now to process 700 in FIG. 7, in step 710 a test signal is generated. The test signal may comprise first and second pulses operable to create respective first and second current levels in or of a cathode.

In step 720, leakage and offset current is measured for a number of drivers coupled to cathodes in the cathode ray tube. The input stage 310 of FIG. 3 or 4 may be used to accomplish this.

In step 730, a first reference signal (e.g., $I_{BIAS}$) is compared to a first signal derived from a cathode ray tube in response to a first pulse applied to a cathode. For example, the first pulse may be the one of the $V_{BIAS}$ pulses in FIG. 2 (212–216). This step may comprise applying a vertical blanking pulse (e.g., $V_{G1-blank}$) to the cathode ray tube while simultaneously applying a signal to the drivers. The signal may be designed to create essentially zero beam current in the cathodes whose response is currently not being measured. A suitable signal may be the blacker than black signal 210 in FIG. 2. Step 730 may include subtracting off the currents measured in step 720.

In step 740, a second reference signal (e.g., $I_{GAIN}$) is compared to a second signal derived from a cathode in response to a second pulse applied to the cathode. For example, the second pulse may be the one of the $V_{GAIN}$ pulses in FIG. 2 (222–226). This step may comprise applying a signal to the gain drivers whose cathode currents are not being measured. The signal may be designed to create essentially zero beam current in those cathodes. A suitable signal may be the blacker than black signal 210 in FIG. 2. Steps 730 and 740 may be performed simultaneously.

In step 750, a bias signal for the cathode is modified with a first compensating signal based on the comparison step 730. The compensation signal may be $V_{BC}$.

In step 760, a gain signal for the cathode whose current is being measured is modified with a second compensating signal based on the comparison step 750. The compensation signal may be $V_{GC}$. Steps 750 and 760 may be performed simultaneously.

Figure 8:
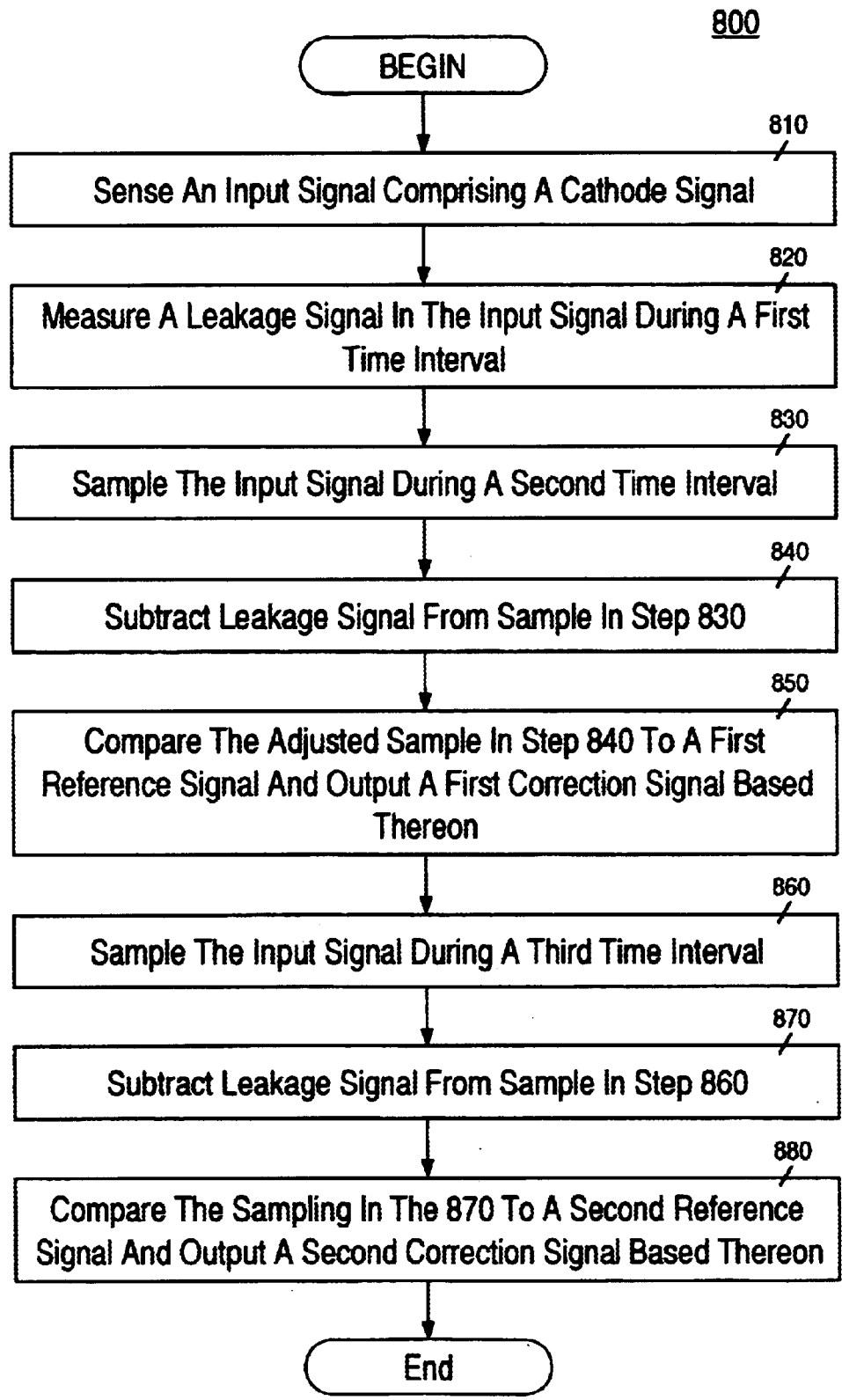
FIG. 8 is a flowchart illustrating steps of a process of regulating a signal, according to embodiments of the present invention.

Process 800 of FIG. 8 describes another embodiment of the present invention. Those of ordinary skill in the art will recognize that the steps of process 800 may be performed in other orders and that some steps may be performed simultaneously. FIG. 4 may also be referred to in this description. In step 810, an input signal comprising a cathode signal is sensed. For example, the input stage 310 samples an input signal from a cathode.

In step 820, a leakage signal is measured in the input signal during a first time interval. For example, the input stage 310 measures and stores the leakage signal at the gate of M2.

In step 830, the input signal is sampled during a second time interval.

For example, switch SH2 samples from the gate of M1 when signal P2 is active. This signal is fed to the gate of M5.

In step 840, the leakage signal is subtracted from the sample in step 830. For example, the transistor M4 samples the gate of M2. Also, transistors M4 and M5 are coupled together to subtract off the leakage current.

In step 850, the adjusted sample in step 840 is compared to a first reference signal and a first correction signal is output based thereon. For example, $I_{BIAS}$ is compared to the current through M4 and M5 and A3 outputs a compensation signal. The bias compensation signal may be applied continuously.

In step 860, the input signal is sampled during a third time interval. For example, switch SH3 samples the gate of M1 when signal P3 is active. This signal is fed to the gate of M6.

In step 870, the leakage signal is subtracted from the sample in step 860. For example, the transistor M7 samples the gate of M2. Also, transistors M6 and M7 are coupled together to subtract off the leakage current.

In step 880, the sampling in step 870 is compared to a second reference signal and a second correction signal is output based thereon. For example, For example, $I_{GAIN}$ is compared to the current through M7 and M8 and A4 outputs a compensation signal. The gain compensation signal may be applied continuously. Thus, the bias and gain compensation signals may affect the amount of compensation used in the other stage. Process 800 may involve multiple bias 410 and gain stages 420, using different timing signals.

While embodiments of the present invention have been described as regulating a current in a cathode ray tube, the present invention is not so limited.

Therefore, it will be seen that embodiments of the present invention provide a circuit and method for regulating a signal, such as a beam current in a cathode ray tube. Embodiments consume less power than some conventional techniques. Embodiments do not change system response time, as do some conventional techniques. Embodiments are suitable for a system in which the CRT is AC coupled to driver circuitry.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A regulation circuit comprising:

an input stage operable to receive an input signal and to produce a sense signal based on said input signal;

elements for inputting a plurality of timing signals including a first and a second timing signal;

a first stage coupled to said input stage and at least one of said elements and operable to compare a first reference signal with sa sense signal when said first timing signal indicates and to output a first correction signal based on said first stage comparison; and a second stage coupled to said input stage and at least one of said elements and operable to compare a second reference signal with said sense signal when said second timing signal indicates and to output a second correction signal based on said second stage comparison.

2. The circuit of claim 1, further comprising:

elements coupled to said input signal and operable to measure a leakage signal in said input signal during a time interval defined by a third timing signal of said plurality of timing signals.

3. The circuit of claim 1, wherein said first stage is further operable to subtract said leakage signal from said sense signal prior to said comparison.

4. The circuit of claim 3, wherein said second stage is further operable to subtract said leakage signal from said sense signal prior to said comparison.

5. The circuit of claim 1, further comprising:

additional first and second stages operable to execute comparisons during intervals defined by additional timing signals of said plurality of timing signals and to output additional correction signals.

6. A circuit as in claim 1, wherein:

said input stage is operable to input signals from a plurality of cathodes.

7. A circuit as in claim 6, wherein:

said first correction signal is operable to be input to a bias control amplifier coupled to a cathode of said plurality of cathodes.

8. A circuit as in claim 6, wherein:

said second correction signal is operable to be input to a gain driver coupled to a cathode of said plurality of cathodes.

9. A method for regulating cathode current comprising:

a) sensing an input signal comprising a cathode signal;

b) sampling said input signal during a first time interval;

c) comparing said sampling in said b) to a first reference signal and outputting a first correction signal based thereon;

d) sampling said input signal during a second time interval; and e) comparing said sampling in said d) to a second reference signal and outputting a second correction signal based thereon.

10. A method according to claim 9, wherein said method further comprises:

measuring a leakage signal in said input signal during a third time interval.

11. A method according to claim 10, wherein said c) comprises:

subtracting said leakage signal from said sampling in said b) prior to said comparison.

12. A method according to claim 11, wherein said e) comprises:

subtracting said leakage signal from said sampling in said d) prior to said comparison.

13. A method according to claim 10, wherein said b) and said d) comprise inputting first and second timing signals.

14. A circuit for regulating cathode ray tube current comprising:

a first stage operable to input a current from a cathode and produce a cathode signal based on said current;

a bias comparison stage coupled to said input stage and operable to input a first timing signal and to compare a first reference signal with said cathode signal when said first timing signal is active and to output a bias compensation signal based thereon;

a gain comparison stage coupled to said input stage and operable to input a second timing signal and to compare a second reference signal with said cathode signal when said second timing signal is active and to output a gain compensation signal based thereon; and wherein said first and second compensation signals are operable to regulate current in the cathode.

15. The circuit of claim 14, wherein said input stage inputs a third timing signal and stores a leakage signal based on a value of said input current when said third timing signal is active.

16. The circuit of claim 15, wherein said gain and bias comparison stages are further operable to subtract said leakage signal from the respective cathode signals before the respective comparisons.

17. The circuit of claim 14, wherein said gain comparison stage is further operable to output said gain compensation signal to a driver that is AC coupled to said cathode.

18. The circuit of claim 14, wherein said bias compensating signal is operable to be fed into a clamping driver.

19. The circuit of claim 14, wherein said circuit comprises a plurality of said bias comparison stages inputting distinct first timing signals, wherein said plurality of bias comparison stages are coupled to and regulate current in said plurality of cathodes.

20. The circuit of claim 19, wherein said circuit comprises a plurality of said gain comparison stages inputting distinct second timing signals, wherein said plurality of gain comparison stages are coupled to and regulate current in plurality of corresponding cathodes.

* * * * *